Jan. 25, 1949.  J. K. SIMPSON  2,460,196

BALANCED FLUID MOTOR VALVE

Original Filed July 7, 1941

INVENTOR
JOHN KEITH SIMPSON
BY Cecil F. Arens
ATTORNEY

Patented Jan. 25, 1949

2,460,196

UNITED STATES PATENT OFFICE 2,460,196

BALANCED FLUID MOTOR VALVE

John Keith Simpson, Leamington Spa, England, assignor to Automotive Products Company Limited, Leamington Spa, Warwickshire, England Original application July 7, 1941, Serial No. 401,370, now Patent No. 2,361,130, dated October 24, 1944. Divided and this application February 11, 1944, Serial No. 522,006. In Great Britain July 10, 1940

1 Claim. (Cl. 121—46.5)

This invention relates to controlling systems operated by fluid pressure and it has for its primary object to provide a simple yet efficient form of controlling system utilizing a valve of the follow-up or hunting type so as to produce a servo action by using pressure fluid from a convenient source.

As a further object the invention sets out to provide an extremely compact form of servo unit which is adapted to be operated in conjunction with the customary liquid pressure remote control system of an aircraft and which is useful for working the engine throttles and other devices of a similar nature in which power assistance is desirable.

According to the invention there is provided for a fluid pressure remote control system, a motor unit fed with pressure fluid by way of a valve having a follow-up action arranged to bring the movable member of the motor unit to a position corresponding with that occupied by a valve actuating member, characterized by the fact that the motor unit is permanently urged in one direction by a force produced by the pressure fluid from the supply, and the setting of said motor unit is altered by presenting in opposition to said force, a fluid force which is greater or less than said force, depending upon the direction in which the motor unit is to be actuated.

In a motor cylinder unit operating in conjunction with a follow-up valve, said motor cylinder unit being arranged so that its piston element automatically assumes a position corresponding to that of a valve actuating member, according to a feature of the invention the piston element of the motor cylinder unit has on its two sides, working spaces of unequal effective cross-sectional area, the smaller of which spaces is permanently connected with the fluid pressure supply, while the larger is connected with the follow-up valve so that when the valve and motor unit are in equilibrium said larger space is sealed, but movement of the valve to change the setting of the motor piston causes said valve to connect said larger space, either to the supply or to an outlet, depending upon the direction of the desired piston movement. Conveniently the motor unit comprises a pair of cylinders each having its own piston, said pistons being operatively connected together and being urged in one direction by fluid pressure acting in one only of the cylinders, and in the opposite direction by pressure fluid acting in both cylinders simultaneously.

Further, in a motor cylinder unit the double-acting piston element of which is mechanically connected with a control valve of the follow-up type and with a valve actuating member, according to the invention the area of the piston element upon which fluid acts to move said piston element in one direction is greater than the corresponding opposing area of the piston element, the working space within which fluid acts upon said opposing area being in permanent communication with the supply of pressure fluid, the valve device being arranged to seal the other working space (i. e. that having the greater operative area) when the motor unit is in equilibrium, and to place said other space in communication with the pressure supply or with the exhaust when the piston element is required to move in one direction or the other. The piston element may comprise a pair of pistons mounted upon a common piston rod but sliding in individual cylinder spaces, those working spaces at corresponding ends of the two cylinders being connected together and being fed in common through the control valve, and one of the remaining spaces being in permanent communication with the pressure fluid, while the other is open to the atmosphere. The cylinders may be coaxially arranged, the pistons being carried upon a single piston rod, the latter conveniently being hollow so that its interior serves to connect together those two working spaces within which fluid acts simultaneously in the same direction upon the pistons.

The valve which controls the flow of fluid to and from the working space, having the larger operative cross-sectional area, may conveniently comprise a primary valve member which is connected operatively with the valve actuating member and which seats upon, and is adapted to move a secondary valve member, the latter having engagement with a fixed seating. The valve may be urged towards its "off" position by fluid pressure which is substantially proportional to the effective force on the piston element, whereby the operator, in actuating the valve, "feels" the force which is being exerted upon the piston by the working fluid.

The invention is illustrated by way of example in the accompanying diagrammatic drawings, in which.

This application is a division of my application

Serial No. 401,370 filed July 7, 1941, now Patent No. 2,361,130.

Figure 1:
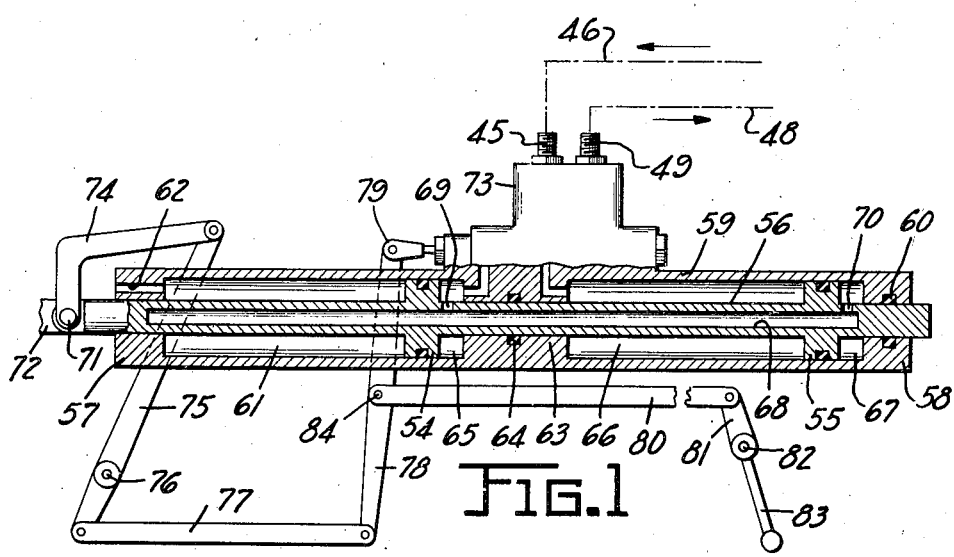
Figure 1 is a sectional elevation showing the invention.
Figure 2:
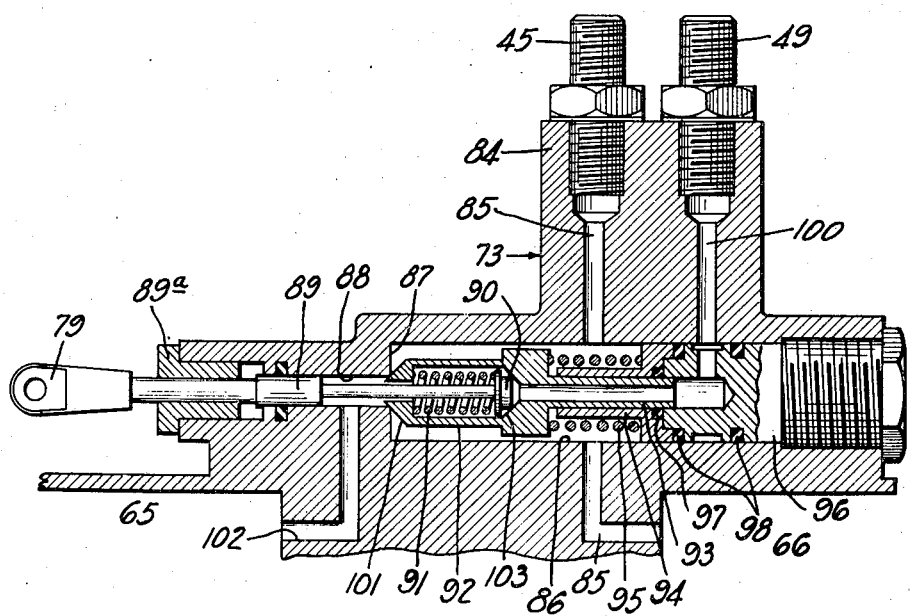
Figure 2 is a sectional elevation through the control valve device of Figure 1 drawn to an enlarged scale.

One form of motor cylinder unit and control valve device is shown in Figures 1 and 2, and the difference in the effective areas of the working spaces in the motor cylinder unit is obtained by having two pistons. These are indicated at 54 and 55 and they are carried by a common piston rod 56 extending through both end walls 57 and 58 of the cylinder, the latter being indicated at 59. The end wall 58 is provided with a packing 60 to prevent leakage of fluid from the adjacent working space 67, but the end wall 57 needs no packing, for the adjacent cylinder space 61 is open to the atmosphere through a passage 62. The cylinder 59 is provided intermediate its length with a fixed partition 63 through which the piston rod 56 passes slidably, a packing 64 being arranged to prevent leakage between the adjoining working spaces 65 and 66. The piston rod is formed with an axial cavity 68, which, by means of holes 69 and 70, forms a permanent connection between the working spaces 65 and 67.

The piston rod 56 is connected at 71 with the member to be operated, as shown at 72, and it is also connected with a control valve device indicated generally at 73. For this purpose, a link 74 connects the piston rod 56 with the upper end of a lever 75, which is pivotally anchored at 76 and has its lower end connected by a link 77 with the lower end of a floating lever 78. The upper end of the latter is connected with a bifurcated fitting 79 arranged to actuate the control valve device 73 as will be hereinafter explained. A link 80 connects the middle point 84 of the floating lever 78 with an actuating lever 81, which latter is pivoted at 82 and has an operating handle 83. This linkage is intended to produce a hunting or follow-up effect in the action of the control valve 73, and is merely indicated diagrammatically in Figure 1, as various other mechanisms are equally applicable. When the handle 83 is moved, the link 80 deflects the floating lever angularly about its lower end, thus causing the control valve device 73 to bring about movement of the piston rod 56, and this, through the medium of the link 74, lever 75 and link 77, restores the control valve device to its inoperative position as the piston rod assumes the position corresponding to that of the handle 83.

The construction of the control valve device is shown in Figure 2, and it comprises a body 84 having an inlet connection 45 for pressure liquid, and an exhaust connection 49. The inlet connection 45 is in permanent communication with the working space 66 by way of a passage 85, so that the supply pressure is always acting upon the left hand surface of the piston 55. Intersecting the passage 85 is a bore 86 having a shoulder 87 where it leads into a smaller coaxial bore 88. The latter contains a slidable rod 89 which passes through a plug 89a and has the fitting 79 secured to its extremity. The opposite end of the rod 89 is reduced to form a stem having at its end a head 90 which is flanged to engage a coiled compression spring 91. The headed rod 89, 90 constitutes the primary valve member, the spring 91, as well as the head 90, being disposed within the hollow head portion 92 of a secondary valve member having a tubular stem 93. This is slidably mounted in a sleeve member 94 which is held by a coiled compression spring 95 in permanent engagement with a screw-threaded plug 96 closing the end of the bore 88. A packing ring 97 prevents leakage of liquid past the outside of the sleeve 93, and a pair of rings 98 seal the plug 96 in the bore 86. A passage 100 leads from the connection 49, through the plug 96, and thence to the interior of the secondary valve member 92, 93. The spring 95, which is stronger than the spring 91, urges the hollow head 92 to the left, so that its frustoconical end 101 engages normally with the relatively sharp edge of the shoulder 87, thus isolating from the pressure supply passage 85, the bore 88 and a passage 102 leading therefrom to the working spaces 65 and 67. The head 90 of the primary valve member has a relatively sharp edge arranged to engage a frusto-conical seating 103 under the action of the spring 91, and it will be seen that this engagement isolates the working spaces 65 and 67 from the exhaust passage 100.

The action of the control valve and motor unit shown in Figures 1 and 2 is as follows. When the rod 89 is in its neutral position, as in Figure 2, the working spaces 65 and 67 are sealed, for they are neither in communication with the pressure passage 85, nor the exhaust passage 100. Therefore, the pressure liquid from the supply acts within the working space 66, and, in pressing upon the piston 55, causes said piston and also the piston 54 to raise the pressure of the trapped liquid in the working spaces 65 and 67, a state of equilibrium being reached when the pressure in said spaces 65 and 67 reaches a value substantially half that of the supply. To bring about movement of the piston rod 56 to the left, the rod 89 is slid to the right (by the action of the handle 83 and associated mechanism as previously described) and this causes the head 90 to displace the secondary valve member 92, 93 to the right, thus allowing liquid at full supply pressure to enter the working spaces 65 and 67 by way of the passage 102. The effective piston area upon which this acts, namely the right-hand surfaces of both pistons 54 and 55, is, of course, twice the area of the left-hand surface of the piston 55 which is subject permanently to the supply pressure, so that the piston rod 56 moves to the left until such time as the control valve reverts to its "off" position. Similarly, when the rod 89 is pulled out, the head 90 leaves the seating 103, enabling liquid to escape from the working spaces 65 and 67 to the exhaust passage 100, as the pressure liquid within the working space 66 urges the pistons 54 and 55, with their piston rod 56, towards the right. With the pistons 54 and 55 arranged to have equal effective cross-sectional areas, the effort produced is the same for both directions of operation, although this is, of course, not an essential condition for the working of the device, for the effort in one direction may be made greater than that in the other by having the pistons 54 and 55 of different sizes.

The control valve device is arranged to be unaffected by changes in the supply pressure and the valve is balanced in itself. The seating diameter of the head 92 upon the end of the bore 88 is arranged to be equal to the outside diameter of the tubular stem 93, so that the secondary valve member 92, 93 is balanced with respect to the supply pressure when the valve device is "off" as shown in Figure 2. At the same time the reduced liquid pressure in the working spaces 65 and 67 present within the head 92 has no tendency to change the position of the parts, for the seating diameter of the head 90 is the same as that of the rod 89. When the head 92 of the auxiliary valve member leaves the shoulder 87, the interior of said head 92 becomes filled with liquid at supply pressure, and the same completely balanced state exists. Likewise, when the head 90 of the primary valve member leaves its seating, pressure within the head 103 becomes substantially zero, but the secondary valve member remains in balance. The arrangement shown in Figures 1 and 2 has the particular advantages that it is simple and compact.

The constructions described are of course given by way of example only, and various modifications may be made in the construction and arrangement of the parts. If desired air or other gas may be used as the working fluid, but liquid is preferable in order to secure accurate working.

I claim:

In a valve for controlling the flow of fluid to a fluid motor of the class wherein a pair of cylinders coaxially arranged house a pair of pistons connected one to the other for movement together and with corresponding ends with equally effective areas, the combination of a valve body having inlet and exhaust ports, a passageway connecting one end of one of said cylinders to the inlet port at all times, a passageway connecting the other end of said one cylinder and the corresponding end of the other cylinder to the inlet port, a passageway connecting the other end of said one cylinder and the corresponding end of the other cylinder to the exhaust port, a secondary valve normally seated in the second named passageway and constructed and arranged to be hydraulically balanced, a spring urging a secondary valve toward its seat, said secondary valve being constituted with a hollow interior which forms a part of said last named passageway and which includes a valve seat therein, a primary valve located in the hollow interior of said secondary valve and normally urged against said seat and constructed and arranged to be hydraulically balanced, a spring urging said primary valve toward the seat, and manual means for selectively opening the secondary and primary valves against the spring force only of their respective springs, said secondary and primary valves being so arranged one with respect to the other that any force applied to said manual means in a direction tending to open said secondary valve urges said primary valve toward closed position and any force applied to said manual means in a direction tending to open said primary valve urges said secondary valve toward closed position.

JOHN KEITH SIMPSON.

REFERENCES CITED

The following references are of record in the file of this patent:

UNITED STATES PATENTS

| Number | Name | Date |
| --- | --- | --- |
| 178,965 | Sellers | June 20, 1876 |
| 243,450 | Lafargue | June 28, 1881 |
| 639,673 | Dyblie | Dec. 19, 1899 |
| 825,866 | Rogers | July 10, 1906 |
| 849,958 | Abrego | Apr. 9, 1907 |
| 1,565,767 | Westbrook | Dec. 15, 1925 |
| 1,588,659 | Christensen | June 15, 1926 |
| 1,630,810 | Simpson | May 31, 1927 |
| 1,815,619 | Hallett | July 21, 1931 |
| 1,991,902 | Lloyd | Feb. 19, 1935 |
| 2,085,105 | Lex | June 29, 1937 |
| 2,244,317 | Rockwell | June 3, 1941 |
| 2,310,625 | Fischer | Feb. 9, 1943 |
| 2,352,344 | Rockwell | June 27, 1944 |

FOREIGN PATENTS

| Number | Country | Date |
| --- | --- | --- |
| 16,193 | Great Britain | Sept. 9, 1892 |

Certificate of Correction

January 25, 1949.

Patent No. 2,460,196.

JOHN KEITH SIMPSON

It is hereby certified that errors appear in the printed specification of the above numbered patent requiring correction as follows:

Column 5, line 36, for the words "a secondary" read *said secondary*; column 6, line 3, for "toward the" read *toward its*; and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*